United States Patent
Fleck et al.

(10) Patent No.: US 10,452,197 B2
(45) Date of Patent: Oct. 22, 2019

(54) THRESHOLD BASED COORDINATE DATA GENERATION PROVIDING TAP ASSIST

(71) Applicant: Wacom Co., Ltd., Saitama (JP)

(72) Inventors: David Charles Fleck, Vancouver, WA (US); Daniel Lee Tower, Vancouver, WA (US); Charles Heart Ohi, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 136 days.

(21) Appl. No.: 15/190,913

(22) Filed: Jun. 23, 2016

(65) Prior Publication Data

US 2017/0371484 A1    Dec. 28, 2017

(51) Int. Cl.
*G06F 3/0354* (2013.01)
*G06F 3/041* (2006.01)

(52) U.S. Cl.
CPC ........ *G06F 3/0418* (2013.01); *G06F 3/03545* (2013.01)

(58) Field of Classification Search
None
See application file for complete search history.

(56) References Cited

U.S. PATENT DOCUMENTS

| | | | |
|---|---|---|---|
| 7,626,580 B2 | 12/2009 | Keely et al. | |
| 8,994,670 B2 * | 3/2015 | Tong | G06F 3/04883 345/173 |
| 2010/0017758 A1 | 1/2010 | Zotov et al. | |
| 2013/0278550 A1 * | 10/2013 | Westhues | G06F 3/03545 345/174 |
| 2015/0227258 A1 | 8/2015 | Wang et al. | |

FOREIGN PATENT DOCUMENTS

| | | |
|---|---|---|
| EP | 2 549 366 A1 | 1/2013 |
| JP | 3636792 B2 | 4/2005 |

OTHER PUBLICATIONS

European Search Report for EP 17 17 7303 dated Oct. 24, 2017, 7 pages.

* cited by examiner

*Primary Examiner* — Brian M Butcher
(74) *Attorney, Agent, or Firm* — Seed Intellectual Property Law Group LLP

(57) ABSTRACT

A method for operating a sensor surface includes detecting an initial position of a stylus relative to the sensor surface, determining initial coordinate values based on the detected initial position of the stylus, and communicating the initial coordinate values for further processing. The method further includes determining subsequent coordinate values based on a subsequent position of the stylus detected after detecting the initial position and, based on a characteristic of the initial or subsequent position detection, modifying the subsequent coordinate values to represent a position that is different than the subsequent position of the stylus. The subsequent coordinate values may be modified to be the same as the initial coordinate values that represent the initial position of the stylus. The modified coordinate values are communicated for further processing. Also disclosed are embodiments of a sensor surface and a computer-readable medium having executable code stored thereon that implement the described methods.

23 Claims, 7 Drawing Sheets

THRESHOLD BASED COORDINATE DATA GENERATION PROVIDING TAP ASSIST

BACKGROUND

Technical Field

This disclosure generally relates to detection of the position of a stylus on a sensor surface, and more particularly to generating and reporting of coordinate values reflecting the position of a stylus relative to a sensor surface.

Description of the Related Art

Stylus-based input using, for example, a tablet-based computer or a computer peripheral having a sensor surface, is becoming increasingly prevalent. In many respects, use of a stylus on a touch sensitive display or surface (or more generally, a "sensor surface") provides the user with a feel of using a pen to write on paper. As the stylus is drawn across the sensor surface, circuitry in the surface detects the position of the stylus at intervals of time and supplies coordinate values (typically expressed as a pair of X, Y values) reflecting the detected positions of the stylus at each time interval. The coordinate values are typically supplied to application software which, in operation, interprets the coordinate values and produces output on a display, such as handwritten strokes, selection and/or movement of icons, input of data, and the like.

Application software may also be programmed to recognize gestures that are input by interaction of a stylus with a sensor surface. For example, application software may interpret a single tap by a stylus on a sensor surface as selecting an object or placing the focus of a cursor at a corresponding location on a display, analogous to a button click on a computer mouse. If the sensor surface detects two taps in close succession, the application software may interpret the gesture as a double tap and initiate an action represented by an object or select a block of text on the display at the location of the double tap, or take other action as programmed. Further movement by the stylus after detecting a tap gesture may be interpreted as a drag operation in which a tapped object is moved to another location on the display or text is selected.

Problems arise when the application software interprets the stylus input in a manner contrary to what the user intended. When using a stylus on a smooth sensor surface, there may be a tendency for the tip of the stylus to inadvertently slip on the surface when the stylus initially touches the surface. The tendency for an inadvertent slip to occur becomes more noticeable when the user of the stylus attempts to tap the surface. Movement of the stylus on the sensor surface during a tap action may cause application software to misinterpret the tap and instead consider the stylus input as a drag operation, causing unwanted movement of objects or selection of text on a display. An accidental drag operation can be problematic because unintentionally dragging an object on a display may cause surprising actions that the user did not intend, such as moving a folder into another folder instead of merely selecting the folder, or moving part of a word in text to an unintended location. In other circumstances, inadvertent movement of the stylus during a tap operation may cause application software to show unintended drawing strokes on the display.

Accidental slip of the stylus may be more pronounced in usage scenarios such as mobile use when the sensor surface is typically held in an unstable condition, such as when the device containing the surface is held in a hand or on a lap. Slipping during a tap can also be attributed to insufficient friction between the stylus tip and the surface. The amount of slip may be affected by the material of the sensor surface and/or the material of the stylus tip that contacts the sensor surface. However, merely increasing the friction between the stylus and the surface to overcome inadvertent slipping has a drawback of changing the feel of the stylus-surface interaction, such as changing the feel of a drawing action, that for many users is undesirable.

BRIEF SUMMARY

The present disclosure provides solutions to the foregoing issues and other problems that arise from unintended slipping or other inadvertent movements of a stylus with respect to a sensor surface, especially during a tap action. Generally speaking, a tap action may be preserved (thereby avoiding an unintended drag operation) by temporarily "locking" the stylus' position coordinates that are reported to the operating system and/or application software, to a single location, such as the location of initial contact of the stylus on the surface. In such cases, the application software receiving the "locked" position coordinates responds as though the stylus has not moved relative to the surface, even though the stylus may have actually moved due to an accidental slip. Temporarily locking (or maintaining unchanged) the reported position coordinates for a short time duration or a short distance that is characteristic of a slip allows the application software to simply receive the position coordinates and act on the reported location of the stylus as representing the position of the stylus, regardless of whether the reported position coordinates represent the actual position of the stylus on the sensor surface. In this manner, the application software does not require any added routines that attempt to recognize and/or compensate for accidental slip of the stylus. Because tap gestures are typically short in duration, and because movement of the stylus during a tap gesture usually results from unintentional slip, eliminating the appearance of the slip in the reported position coordinates (by temporarily locking the reported position coordinate values to a single location) assures that intended tap gestures are not misinterpreted, e.g., as a drag operation, by application software receiving the reported position coordinates.

U.S. Pre-Grant Publication No. 2010/0017758 describes a system that attempts to address stylus movement during a tap gesture on a digitizer surface. When a "pen-down" event occurs, the system waits and does not generate "mouse move" events for a short time period after the pen comes in contact with the digitizer surface. During this period of delay, the system monitors movement of the pen. As soon as the gesture made by the pen movement is recognized (or believed to be recognized), e.g., based on one or more predetermined or preset threshold parameters, the previously-delayed mouse move events may be communicated and processing may continue based on this gesture recognition.

In contrast, with embodiments of the present disclosure, there is no delay in reporting coordinate values which the remainder of the system can immediately process as representing the position of the stylus, regardless of whether the reported coordinate values represent the actual position of the stylus. Instead of waiting, the sensor surface (preferably by way of firmware or a device driver) immediately starts outputting coordinate data that is "locked" to the initial position of the stylus until a threshold is met, and once the threshold is met, the sensor surface thereafter reports coordinate data that represents the actual position of the stylus. Application software receiving the reported coordinate data does not require special programming or routines to compensate for apparent slip of the stylus. Instead, circuitry in the sensor surface has already compensated for apparent slip by outputting coordinate data that is "locked" to the initial position of the stylus until a threshold is met. Embodiments of the present disclosure are advantageous as they can operate without needing to classify or recognize a gesture. Embodiments of the present disclosure appear more responsive to the user as there is no period of delay before coordinate data is communicated. Immediate feedback is provided in response to stylus movement instead of waiting and watching, before attempting to classify the gesture as taught in U.S. Pre-Grant Publication No. 2010/0017758.

In various embodiments, the present disclosure describes methods, apparatus, and computer-readable media for operating a sensor surface that reports coordinate values reflecting the position of a stylus relative to the sensor surface. For example, a method embodiment of the present disclosure may include steps of detecting an initial position of a stylus relative to a sensor surface, determining initial coordinate values based on the detected initial position of the stylus, and communicating the initial coordinate values for further processing. The method may further include determining subsequent coordinate values based on a subsequent position of the stylus detected after detecting the initial position, and based on a characteristic of the initial or subsequent position detection, modifying the subsequent coordinate values to represent a position that is different than the subsequent position of the stylus, and communicating the modified coordinate values for further processing. Apparatus and computer-readable media embodiments may be configured to implement the method steps described herein.

In various embodiments, the initial coordinate values may be determined when the stylus initially contacts the sensor surface. The modified coordinate values may be communicated to an application program or an operating system for further processing in place of the determined subsequent coordinate values. Such further processing may be, for example, classification of stylus movement based on the modified coordinate values in place of the determined subsequent coordinate values.

In various embodiments, the subsequent coordinate values may be modified by firmware operating in circuitry of the sensor surface, and the modified coordinate values are communicated by the firmware to an application program for further processing. Alternatively, in various embodiments, the subsequent coordinate values may be modified by a device driver that, when executed, enables interaction of an application program with the sensor surface, and the modified coordinate values are communicated by the device driver to the application program for further processing.

In various embodiments, modifying the subsequent coordinate values based on a characteristic of the initial or subsequent position detection may include comparing the characteristic with a threshold. For example, the characteristic may be a distance between the initial coordinate values and the subsequent coordinate values, and the threshold may be a threshold distance. In such embodiments, the subsequent coordinate values may be modified while the distance between the subsequent coordinate values and the initial coordinate values remains within the threshold distance. The threshold distance could be selected such that the threshold is larger than the distance of typical slippage encountered during a tap gesture.

Alternatively, the characteristic may be a time between determination of the initial coordinate values and the subsequent coordinate values, and the threshold may be a threshold time. In such embodiments, the subsequent coordinate values are modified while the time elapsed between determination of the subsequent coordinate values and the initial coordinate values remains within the threshold time. The threshold time could be selected such that the threshold is larger than the time of a typical tap gesture.

In other embodiments, the characteristic may include both a distance between the initial coordinate values and the subsequent coordinate values and a time between determination of the initial coordinate values and the subsequent coordinate values. In such embodiments, the threshold includes a threshold distance and a threshold time. The subsequent coordinate values may be modified while the distance between the subsequent coordinate values and the initial coordinate values remains within the threshold distance and while the time elapsed between determination of the subsequent coordinate values and the initial coordinate values remains within the threshold time.

Because the amount of slip is inversely related to the amount of friction between the tip and surface, in various embodiments, the method further may comprise setting or modifying the threshold based on a friction characteristic of the stylus when the stylus is in contact with the sensor surface. The friction characteristic may be determined based on a material forming a tip of the stylus that contacts the sensor surface. Alternatively or in addition, the friction characteristic may be determined based on a material of the sensor surface to be contacted by the stylus.

In various embodiments, the method may further comprise setting or modifying the threshold based on a situational usage of one or both of the stylus or the sensor surface when the initial position of the stylus relative to the surface is detected. For example, the situational usage may include one or more of the following: a detected angle relative to the sensor surface at which the stylus approaches the sensor surface; a detection that the sensor surface is being held in an unstable position; a known handedness of a user holding the stylus; a detected distance from the sensor surface at which the stylus hovers prior to detection of the initial position of the stylus; a detected speed at which the stylus approaches the sensor surface; a detected tilt of the stylus with respect to the sensor surface; and a detected distance of the stylus from the sensor surface between detection of the initial position and detection of the subsequent position of the stylus.

In various embodiments, the method may further comprise setting or modifying the threshold based on a parameter representing a stylus tip of the stylus. Alternatively or in addition, the method may further comprise setting or modifying the threshold based on a parameter of the sensor surface, wherein the parameter represents a characteristic of the surface contacted by the stylus. The method may also comprise ceasing modification of the subsequent coordinate values in response to the characteristic of the initial or subsequent position detection exceeding the threshold, and thereafter communicating the determined subsequent coordinate values for further processing.

In various embodiments, the modified coordinate values may represent a position that is closer to the initial position of the stylus than the subsequent position of the stylus.

In various embodiments, the subsequent coordinate values are modified by replacing the subsequent coordinate values with the initial coordinate values.

As another example of methods, apparatus, and computer-readable media for operating a sensor surface, the present disclosure describes a non-transitory computer-readable medium having executable code stored thereon, and in response to execution, the code causes processing circuitry to monitor use of a stylus with a sensor surface. In response to detection of the stylus making initial contact with the sensor surface, the processing circuitry reports initial coordinate values for the stylus based on a detected initial position of the stylus relative to the sensor surface. For example, the initial coordinate values may be reported to an application program, either directly or indirectly (e.g., through an operating system layer). The code further causes the processing circuitry to detect a subsequent position of the stylus relative to the sensor surface, and based on a dynamically modifiable coordinate value reporting process, report to the application program (1) subsequent coordinate values that represent the detected subsequent position of the stylus, or (2) alternate coordinate values that do not represent the detected subsequent position of the stylus.

In various embodiments, the coordinate value reporting process may be modified based at least in part on the monitored use of the stylus with the sensor surface. Alternatively or in addition, the coordinate value reporting process may be modified based at least in part on a parameter representing a physical configuration of the stylus. In the latter case, the parameter may represent a stylus tip that is used with the stylus. Alternatively or in addition, the coordinate value reporting process may be modified based at least in part on a parameter representing a physical configuration of the sensor surface.

In various embodiments, at least part of the executable code is included in firmware that is operable in the circuitry of the sensor surface. Alternatively or in addition, at least part of the executable code is included in a device driver that enables interaction of an application program with the sensor surface.

In various embodiments, the coordinate value reporting process may include comparing a characteristic of the initial or subsequent position detection with a threshold, and based on the comparison, reporting (1) the subsequent coordinate values or (2) the alternate coordinate values. In such embodiments, the characteristic may be a distance between the initial coordinate values and the subsequent coordinate values and the threshold may be a threshold distance. The alternate coordinate values are reported while the subsequent coordinate values and the initial coordinate values remains within the threshold distance.

Alternatively, the characteristic may be a time between determination of the initial coordinate values and the subsequent coordinate values and the threshold may be a threshold time. In such embodiments, the alternate coordinate values are reported while the time elapsed between determination of the subsequent coordinate values and the initial coordinate values remains within the threshold time.

In other embodiments, the characteristic may include both a distance between the initial coordinate values and the subsequent coordinate values and a time between determination of the initial coordinate values and the subsequent coordinate values, and the threshold may include a threshold distance and a threshold time. In such embodiments, the alternate coordinate values are reported while the distance between the subsequent coordinate values and the initial coordinate values remains within the threshold distance and the time elapsed between determination of the subsequent coordinate values and the initial coordinate values remains within the threshold time.

In various embodiments, the code may cause the processing circuitry to set or modify the threshold based on a friction characteristic of the stylus when the stylus is in contact with the sensor surface. Alternatively or in addition, the threshold may be set or modified based on the monitored use of the stylus with the sensor surface. In various embodiments, the alternate coordinate values are the same as the initial coordinate values.

As yet another example of methods, apparatus, and computer-readable media for operating a sensor surface, the present disclosure describes a sensor surface comprising a surface providing an interface for interaction with a stylus, and circuitry configured to detect and report a position of the stylus relative to the surface. In operation, the circuitry is configured to detect an initial position of the stylus relative to the surface, determine initial coordinate values based on the detected initial position, report the initial coordinate values for further processing, detect a subsequent position of the stylus relative to the surface, and based on a dynamically modifiable coordinate value reporting process, report for further processing (1) subsequent coordinate values determined from the subsequent position of the stylus, or (2) alternate coordinate values that are not determined from the subsequent position of the stylus.

In various embodiments, the circuitry may include firmware that implements at least part of the coordinate value reporting process and reports (1) the subsequent coordinate values or (2) the alternate coordinate values, to an application program for further processing. Alternatively, the coordinate value reporting process may be implemented, at least in part, by a device driver that, when executed, enables interaction of an application program with the sensor surface, and the alternate coordinate values are reported by the device driver to an application program for further processing.

In various embodiments, the coordinate value reporting process may include comparing a distance between the initial coordinate values and the subsequent coordinate values with a dynamically modifiable threshold distance, as described below in greater detail. In such embodiments, the alternate coordinate values are reported while the distance between the subsequent coordinate values and the initial coordinate values remains within the threshold distance.

Alternatively or in addition, the coordinate value reporting process may include comparing a time elapsed between determination of the initial coordinate values and determination of the subsequent coordinate values with a dynamically modifiable threshold time, as described below in greater detail. In such embodiments, the alternate coordinate values are reported while the time elapsed between determination of the subsequent coordinate values and the initial coordinate values remains within the threshold time.

In various embodiments, the alternate coordinate values are the same as the initial coordinate values.

DETAILED DESCRIPTION

Figure 1A:
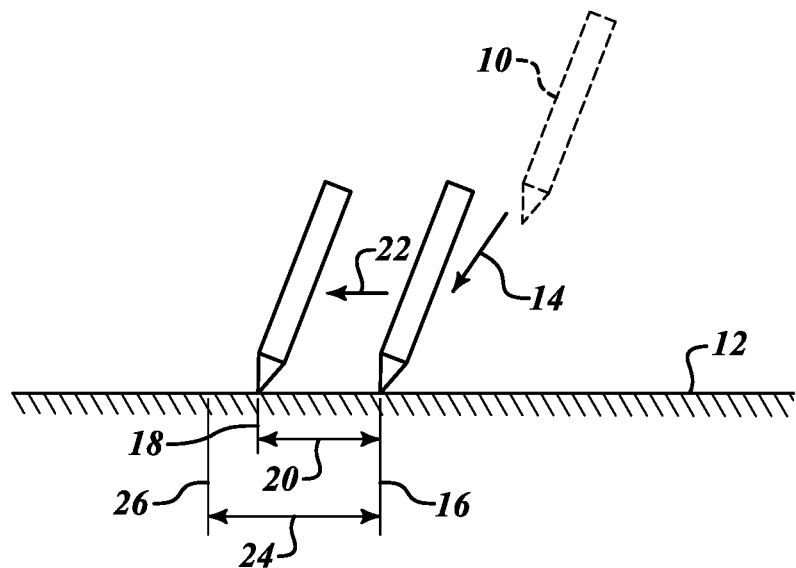
FIGS. 1A and 1B are pictorial diagrams illustrating an example of stylus slip during a single tap action and a double tap action, respectively.

Generally stated, in various embodiments, the present disclosure provides ways to improve the perceived accuracy of user interactions with a sensor surface, particularly tap actions performed with a stylus on the sensor surface. This is done by modifying or altering the reported coordinate values representing the position of the stylus while the stylus movement and/or time of action of the stylus with the sensor surface are within specified thresholds. In some embodiments, as will be described herein, the specified thresholds may be a threshold distance and/or a threshold time having fixed values. In other embodiments, the threshold(s) may be manually, automatically, or dynamically adjusted, particularly if additional information regarding the stylus and/or sensor surface (such as friction or situational usage of the stylus or the sensor surface) is known or detected.

A stylus may be any form of a pen, pointer, or other structure, including a user's finger, that is capable of touching, tapping, and otherwise interacting with a sensor surface. A sensor surface may be any form of a position detecting device that is capable of detecting a stylus and reporting coordinate values that reflect the position and movement of the stylus relative to the surface.

Technologies for sensor surfaces are presently known. For example, some sensor surfaces incorporate pressure-sensitive or analog-resistive film technologies that detect changes in pressure on the surface caused at a point of contact of the stylus on the sensor surface. Other types of sensor surfaces incorporate analog surface capacitive or projected capacitive technologies in which stylus activity is identified using sensors that detect minor changes in electrical current or electrostatic capacitance caused by the stylus. Other examples of sensor surfaces incorporate surface acoustic wave technology that use attenuation in ultrasound elastic waves on the surface to detect the position of a stylus contacting the surface. Further examples of sensor surfaces incorporate optical technologies such as projection and reflection of infrared light where triangulation can be used to determine the position of a stylus relative to the surface. Yet other sensor surfaces incorporate electromagnetic induction technologies that use sensors to detect changes in a magnetic field caused by interaction of a stylus with the sensor surface. The present disclosure contemplates that any of the foregoing technologies, combinations of the foregoing technologies, or yet further developed technologies that enable touch sensitivity of a surface, may be used in embodiments of the disclosure.

In some embodiments, sensor surfaces are implemented as digitizer pads that are positioned separately from a display screen. In other embodiments, sensor surfaces are positioned below or are integrated with a display screen such that interaction of a stylus with the sensor surface causes changes on the display screen at the detected position of the stylus.

Various embodiments described herein refer to inadvertent slip of a stylus on a sensor surface during a tap action. FIG. 1A is a pictorial diagram illustrating one example of stylus slip during a tap action of a stylus 10 on a sensor surface 12. In FIG. 1A, the stylus 10 approaches the sensor surface 12 as indicated by arrow 14. The stylus 10 contacts the sensor surface 12 at an initial position 16. Normally, during a tap action, the stylus 10 is quickly withdrawn from the sensor surface 12 after the initial point of contact is made. However, before the stylus 10 is withdrawn from the sensor surface 12, the stylus 10 may inadvertently slip from the initial position 16 to a subsequent position 18. The distance of the inadvertent slip is indicated by reference numeral 20. While the slip of the stylus 10 in FIG. 1A is shown occurring in the direction of arrow 22, the stylus 10 may slip in any direction along the surface, including a direction opposite of the arrow 22.

When the stylus 10 initially contacts the sensor surface 12, the sensor surface 12 detects the initial position 16 of the stylus 10 relative to the sensor surface. The sensor surface 12 determines initial coordinate values based on the detected initial position 16. The initial coordinate values may be expressed as a pair of X, Y values that define the initial position relative to a coordinate system of the sensor surface. The sensor surface 12 communicates or reports the initial coordinate values, e.g., to an operating system or application software, for further processing.

The sensor surface 12 is configured to repeatedly detect the position of the stylus 10, determine coordinate values representing the detected position of the stylus 10, and communicate the coordinate values for further processing. During the course of a tap action, the sensor surface 12 may determine many coordinate values, even though the period of time in which the stylus 10 is in contact with the sensor surface 12 is short. The coordinate values that are determined and communicated after detecting the initial position 16 are referred to as subsequent coordinate values. The subsequent coordinate values represent the actual detected positions of the stylus 10 after detection of the initial position 16.

Prior to communicating the subsequent coordinate values, e.g., to an operating system or application software as the case may be, circuitry or software in the sensor surface or operation in connection with the sensor surface may modify or alter the subsequent coordinate values in accordance with principles of the present disclosure to represent subsequent positions that are different than the actual subsequent positions of the stylus 10. As will be seen, this modification or alteration of the subsequent coordinate values is useful to compensate for accidental slip of the stylus 10 during a tap action. The modified or alternate coordinate values are communicated for further processing, typically in place of the actual determined subsequent coordinate values.

Figure 1B:
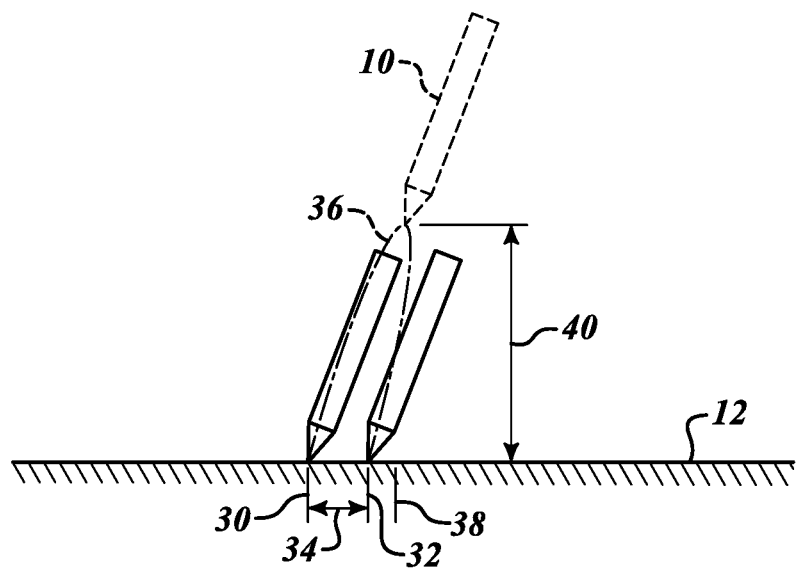

FIG. 1B is pictorial diagram illustrating an example of stylus slip during a double tap action. A double tap action includes two points of contact of the stylus on the sensor surface, typically close in time. Each time the stylus contacts the sensor surface, coordinate values representing the position of the stylus are determined, including coordinate values representing the position of initial point of contact of the stylus as well as subsequent positions of the stylus on the surface until the stylus is lifted from the surface. In FIG. 1B, the stylus 10 approaches the sensor surface 12 and contacts the sensor surface 12 at a first initial position 30. Normally, during a double tap action, the stylus 10 is briefly withdrawn from the sensor surface 12 and quickly contacts the sensor surface again at approximately the same initial position 30, after which the stylus 10 is again withdrawn from the surface. However, in the example shown in FIG. 1B, inadvertent slip of the stylus 10 causes the stylus 10 to contact the sensor surface at a second initial position 32 that is different than the first initial position 30. The distance of the inadvertent slip between the first initial position 30 and the second initial position 32 is indicated by reference numeral 34. While the slip of the stylus 10 in FIG. 1B is shown occurring to the right of the first initial position 30, the stylus 10 may slip in any direction along the surface, including an opposite direction toward the left of the first initial position 30.

As with the example shown in FIG. 1A, the sensor surface 12 shown in FIG. 1B detects the first initial position 30 of the stylus 10 when the stylus initially contacts the sensor surface 12. The sensor surface 12 determines initial coordinate values based on the detected first initial position 30, which may be expressed as a pair of X, Y values, and communicates the initial coordinate values for further processing. In FIG. 1B, the stylus 10 is briefly withdrawn from the sensor surface 12, e.g. along a trajectory 36, and thereafter contacts the sensor surface at the second initial position 32, at which point coordinate values representing the second initial position 32 are determined. As discussed with FIG. 1A, the sensor surface 12 is also configured to repeatedly detect the position of the stylus 10 and thus, after determining the first initial coordinate values (representing the first initial position 30) or the second initial coordinate values (representing the second initial position 32), the sensor surface 12 may also determine subsequent coordinate values representing detected subsequent positions of the stylus on the surface during each of the first and second taps 30, 32 of the double tap action. In accordance with various embodiments described herein, prior to communicating the determined coordinate values, e.g., to an operating system or application software, the determined coordinate values may be modified or altered in accordance with principles of the present disclosure. The modified or altered coordinate values may represent a position of the stylus 10 that is different than the actual detected position of the stylus. Indeed, as will be seen in some embodiments, the determined coordinate values for the second initial position 32 and possibly the subsequent coordinate values determined after determining coordinate values for the first and/or second initial positions 30, 32, are modified or altered to reflect the initial position 30, thus causing the stylus to appear as if it had contacted the same position on the surface for both taps of the double tap action, without any slip of the stylus. Modification of the determined coordinate values may thus compensate for accidental slip of the stylus 10 during the double tap action. The modified or alternate coordinate values may thereafter be communicated for further processing, e.g., to an operating system or application software in place of the actual determined coordinate values.

Figure 2:
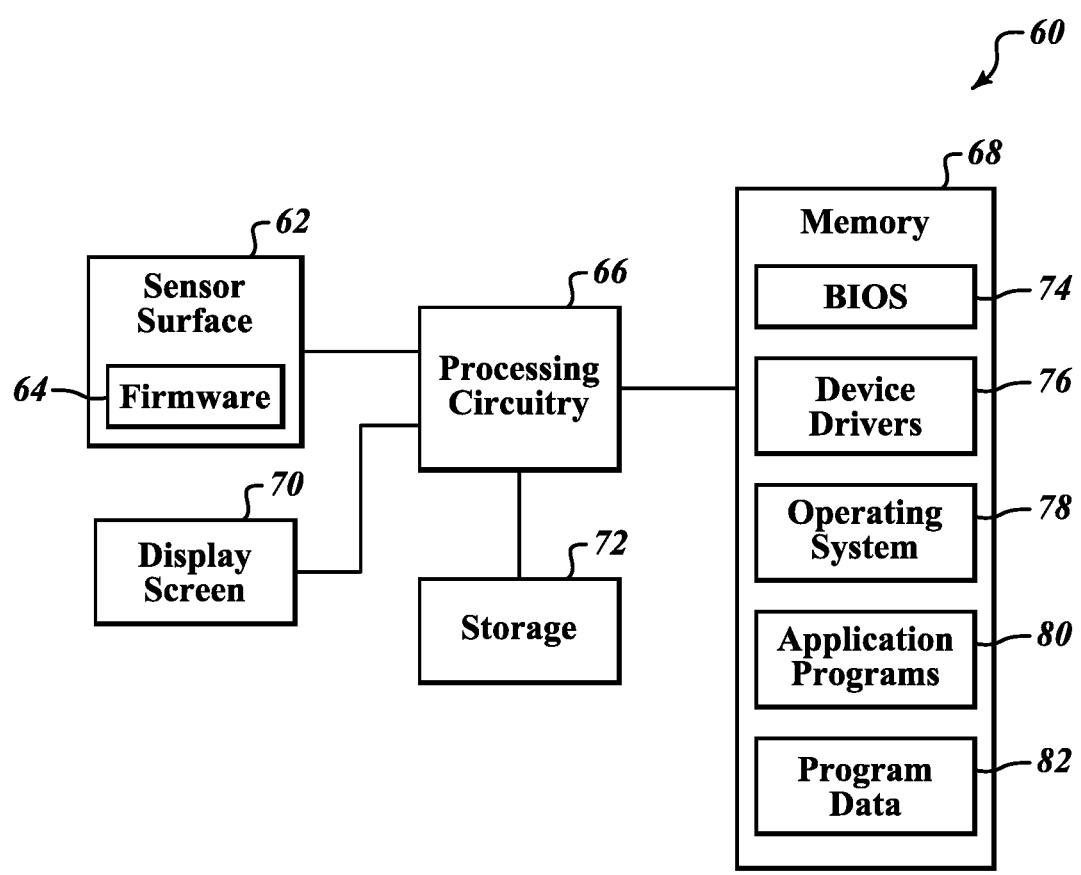
FIG. 2 is a block diagram illustrating one example of a hardware and software configuration of a system operating a sensor surface with firmware in the circuitry of the sensor surface.

FIG. 2 is a block diagram illustrating an example of a system 60 with a sensor surface 62 having a hardware and software configuration in which firmware 64 operating in the circuitry of the sensor surface 62 or in connection with the sensor surface 62 is used when determining and communicating stylus position coordinate values. Alternately, the system 60 may use a device driver 76 for the sensor surface 62, in which the device driver 76 is configured to communicate position coordinate values in accordance with the present disclosure. The system 60 further includes processing circuitry 66 in communication with the sensor surface 62, a memory 68, a display screen 70, and a storage 72. Persons skilled in the art will recognize that suitable systems for operating a sensor surface may include greater or fewer components that those illustrated in FIG. 2.

In various embodiments, the display screen 70 includes any type of display screen technology, such as, for example, an LCD or LED display. As mentioned earlier, the sensor surface 62 may be implemented as a digitizer pad that is positioned separately from the display screen 70. In other situations, the sensor surface 62 may be positioned below or integrated with the display screen 70 such that interaction of a stylus with the sensor surface 62 causes corresponding actions to take place on the display screen 70 at the position of the stylus.

In various embodiments, the memory 68 may include circuitry providing a volatile and/or nonvolatile storage, such as RAM, ROM, EPROM, etc. The memory 68 is used for storage and access of software and data for operation of the processing circuitry 66, including a basic input/output system (BIOS) 74, device drivers 76, operating system 78, application programs 80, and program data 82. To the extent longer-term storage of data and programs is needed, the storage 72 may include hard disk drives, optical disk drives, static or flash memory, etc.

In various embodiments, aspects of operating the sensor surface 62 may be incorporated into firmware 64 operating in circuitry of the sensor surface. Firmware 64 operating in the circuitry of the sensor surface 12 includes firmware operating in connection with the circuitry of the sensor surface 12. Firmware 64 is typically implemented as a type of software that provides control, monitoring, operation, and data manipulation for a device or system, generally at a low level within the device or system. In various embodiments, the firmware 64 may be held in a memory, such as a non-volatile ROM, EPROM, or flash memory, in the sensor surface 62. The memory may be configured to enable future downloading and storage of updated firmware for the sensor surface 62. In accordance with principles of the present disclosure, the firmware 64 is configured to modify coordinate values determined by the sensor surface 62 and communicate the modified coordinate values, e.g., to the operating system 78 or an application program 80 operated by the processing circuitry 66, either directly or via the operating system 78 that controls the overall operation of the processing circuitry 66.

Alternatively, in various embodiments, aspects of operating the sensor surface 62 may be incorporated into a device driver 76 that is used for communicating commands and data between the sensor surface 62 and an application program 80, typically via the operating system 78.

Figure 3:
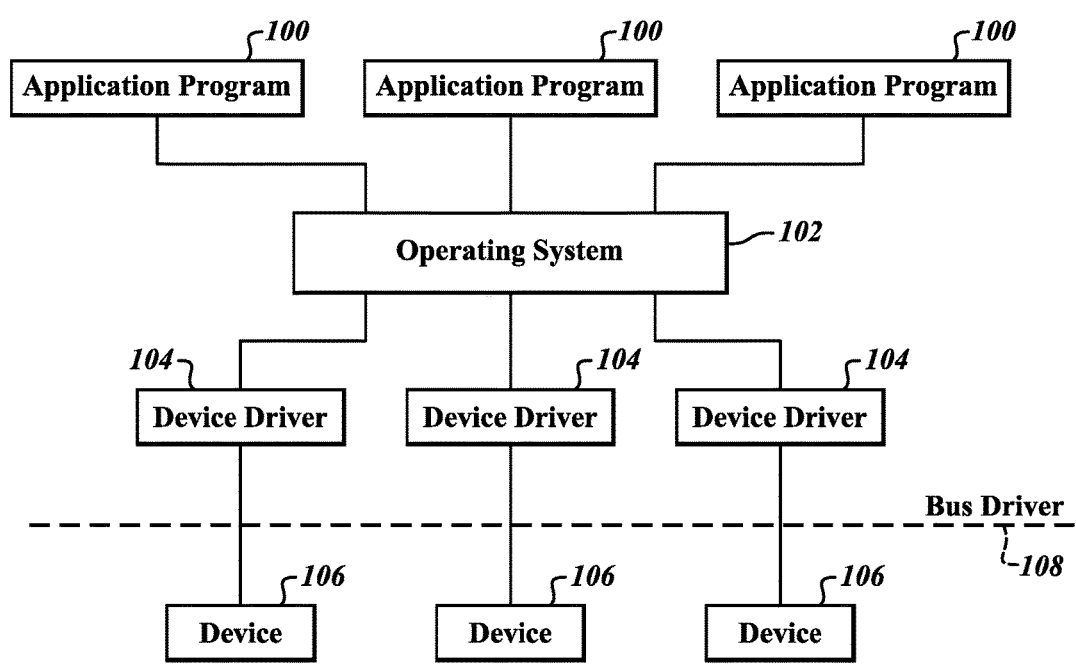
FIG. 3 is a block diagram illustrating a software architecture in which application programs communicate with devices such as a sensor surface via an operating system and device drivers.

As generally illustrated in FIG. 3, application programs 100 communicate with devices 106 via an operating system 102 and device drivers 104. A device driver 104 is a software component that enables an operating system 102 or application program 100 to communicate with a device 106. For example, if an application program 100 desires to receive data from a device 106, the application program 100 typically calls a function implemented by the operating system 102, and the operating system 102 calls a function implemented by the device driver 104 associated with the device 106. The device driver 104 is programmed to communicate with the hardware of the device 106 and receive the desired data from the device 106. After the device driver 104 receives the data from the device 106, the device driver 104 communicates the data to the operating system 102, which in turn communicates the data to the application program 100.

In some instances, a bus driver 108 facilitates communication between a device driver 104 and a corresponding device 106. For example, a device 106 may directly connect to a peripheral component interconnect (PCI) bus, wherein the device driver 104 may directly communicate with the device 106 by reading and writing data at logical addresses that are mapped by the PCI bus driver 108 to the respective device 106. In other cases, a device 106 may not directly connect to a PCI bus, but instead connect to a host bus adapter that is connected to the PCI bus. For example, a USB device may connect to a host bus adapter or USB host controller. The device driver 104 communicates indirectly with the device 106 by communicating with the USB host controller which in turn communicates with hardware that communicates with the device 106. In yet other embodiments, a device driver 104 may communicate with a device 106 using I2C or SPI protocols.

Returning to FIG. 2, a device driver 76 for the sensor surface 62 may be configured in accordance with principles of the present disclosure to modify coordinate values determined by the sensor surface 62 and communicate the modified coordinate values to the operating system 78 or an application program 80 via the operating system 78, for further processing by the application program 80. In either case where the coordinate value reporting process described above is implemented by firmware 64 or a device driver 76, the result is that the application program 80 can simply receive and act on the reported position coordinate values as representing the position of the stylus, regardless of whether the reported position coordinate values represent the actual positions of the stylus. Should accidental slip of the stylus occur, for example during a tap action, the application program 80 does not need any special routines that attempt to detect and/or compensate for the accidental slip. Instead, the accidental slip of the stylus is already compensated by the firmware 64 or device driver 76 which modify the position coordinate values before the coordinate values are communicated to the application program 80. Accordingly, the user of the sensor surface 62 may enjoy a uniform experience with the sensor surface 62, regardless of whether the application programs 80 interacting with the sensor surface 62 are individually able to compensate for accidental slip of the stylus.

Figure 4:
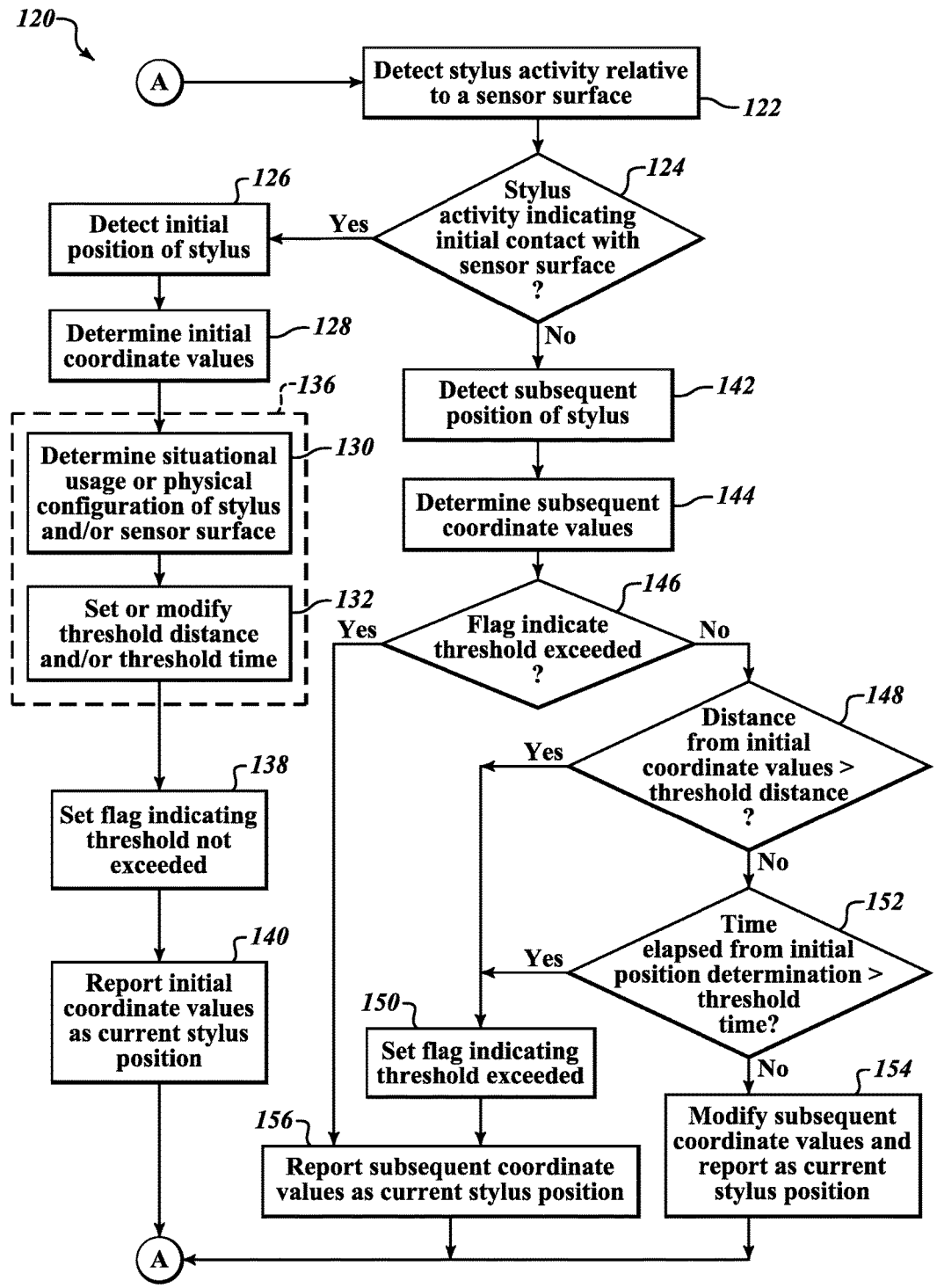
FIG. 4 is a flow diagram illustrating a method for operating a sensor surface with a dynamically modifiable coordinate value reporting process according to various embodiments of the present disclosure.

FIG. 4 illustrates a method 120 for operating a sensor surface with a dynamically modifiable coordinate value reporting process according to various embodiments of the present disclosure. As mentioned earlier, a method of the present disclosure may include evaluating a characteristic of the initial or subsequent position detection and based on the evaluated characteristic, the method includes modifying the determined coordinate values to represent a position that is different than the actual subsequent position of the stylus.

The step of modifying the coordinate values may include comparing the characteristic of the initial or subsequent position detection with a threshold. For example, the characteristic may be a distance between an initial position and a subsequent position of the stylus and the threshold may be a threshold distance. Alternatively or in addition, the characteristic may be a time period between detecting the initial position and the subsequent position of the stylus and the threshold may be a threshold period of time.

The method 120 begins at block 122 where the sensor surface detects stylus activity relative to the sensor surface. At a decision block 124, the sensor surface assesses whether the stylus activity indicates initial contact of the stylus with the sensor surface. If the stylus activity indicates initial contact, the method 120 proceeds to block 126 where the sensor surface detects the initial position of the stylus on the sensor surface. Concurrently or thereafter, the sensor surface determines initial coordinate values that represent the detected initial position of the stylus, as indicated at block 128.

As will be discussed in greater detail below, the sensor surface at block 130 determines a situational usage or a physical configuration of the stylus and/or the sensor surface, and based on that determination, at block 132 the sensor surface sets or modifies one or more thresholds, which may be, for example, a threshold distance and/or a threshold period of time. The combination of blocks 130 and 132, as indicated by reference numeral 136, enables the method 120 to implement a coordinate value reporting process that is dynamically modifiable during operation of the sensor surface. In other embodiments that do not implement a dynamically modifiable coordinate value reporting process but rather implement a static coordinate value reporting process, the combination of blocks 136 may be revised or eliminated such that a fixed threshold distance and/or period of time is set and used for all situational usages or physical configurations of the stylus and sensor surface.

Continuing at block 138, the sensor surface sets a flag indicating that a threshold, e.g., a threshold distance and/or time, has not been exceeded. The threshold flag may be stored in a memory of the sensor surface or a memory of the processing circuitry to which the sensor surface is communicatively connected. At block 140, the sensor surface reports the initial coordinate values as representing the current position of the stylus relative to the sensor surface. Thereafter, the method 120 continues at point A which returns processing by the sensor surface to block 122 for detection of further stylus activity relative to the sensor surface.

As further stylus activity is detected, the sensor surface again evaluates at decision block 124 whether the stylus activity indicates initial contact of the stylus with the sensor surface. In circumstances where the initial contact has occurred and the stylus has not been lifted from the surface, the decision at decision block 124 is negative and the method 120 continues to block 142 where the sensor surface detects a subsequent position of the stylus relative to the sensor surface. Concurrently or thereafter, the sensor surface determines subsequent coordinate values that represent the detected subsequent position of the stylus, as indicated at block 144.

Next, at decision block 146, the sensor surface evaluates whether the threshold flag stored in memory indicates that a threshold has been exceeded. If the evaluation at block 146 is affirmative (i.e., the flag indicates that a threshold has been exceeded), the method 120 continues to block 156 where the subsequent coordinate values determined at block 144 are reported, e.g., to an application program, as representing the current position of the stylus. The application program is thus able to act on coordinate values that represent the actual current position of the stylus. Thereafter, processing by the sensor surface continues at point A which returns to block 122 for detection of further stylus activity relative to the sensor surface. This processing is repeated until the stylus is withdrawn from the sensor surface and is no longer in contact with the sensor surface.

If, at decision block 146, the evaluation is negative (i.e., the flag indicates that a threshold has not been exceeded), the method 120 continues to decision block 148 where the sensor surface evaluates whether the distance between the subsequent coordinate values determined at block 144 and the initial coordinate values determined at block 128 remains within the threshold distance set at block 132. For instance, referring to the single tap action shown in FIG. 1A, the sensor surface 12 evaluates whether the distance 20 between the subsequent position 18 and the initial position 16 of the stylus 10 remains within a threshold distance 24 that extends from the initial position 16 to a threshold position 26. As another example, referring to the double tap action shown in FIG. 1B, the sensor surface 12 evaluates whether the distance 34 between the second initial position 32 and the first initial position 30 is within a threshold distance extending from the first initial position 30 to a threshold position 38.

Returning to FIG. 4, if the evaluation at decision block 148 determines that the distance of the subsequent coordinate values from the initial coordinate values is greater than the threshold distance, the method 120 proceeds to block 150 where the sensor surface sets the threshold flag to indicate that a threshold has been exceeded. The method 120 then proceeds to block 156 where the subsequent coordinate values determined at block 144 are reported by the sensor surface as representing the current position of the stylus. The method 120 thereafter continues at point A which returns processing to block 122 for detection of further stylus activity relative to the sensor surface.

Returning to the decision block 148, if the distance between the subsequent coordinate values and the initial coordinate values is not greater than the threshold distance (i.e., the distance remains within the threshold), the method 120 continues to decision block 152 where the sensor surface evaluates whether the time elapsed between determination of the subsequent coordinate values at block 144 and the initial coordinate values at block 128 remains within a threshold time period. If the evaluation at decision block 152 determines that the elapsed time is greater than the threshold time, the method proceeds to block 150 where the sensor surface sets the threshold flag to indicate that a threshold has been exceeded. The method 120 thereafter proceeds to block 156 where the subsequent coordinate values determined at block 144 are reported by the sensor surface (e.g., to an application program) as representing the current position of the stylus. Thereafter, the method 120 continues at point A which returns processing to block 122 for detection of further stylus activity relative to the sensor surface. It should be understood that, in other embodiments, an evaluation of time elapsed from detection of an initial position of the stylus (as at block 126) to detection of a subsequent position of the stylus (as at block 142) is equivalent to evaluating time elapsed between determination of subsequent coordinate values (as at block 144) and the initial coordinate values (as at block 128) as discussed above.

The foregoing discussion describes use of a flag to indicate when a threshold has been met or exceeded. The flag is initially cleared (block 138) and once the threshold is met or exceeded, the flag is set (block 150). Thereafter, only the flag needs to be tested (block 146), which is less computationally intensive and generally faster than continually comparing coordinate values to the threshold values. Using a flag also improves processing in certain circumstances, e.g., when a user draws a circle. The position of the stylus at the beginning and the end of the circle might be within the threshold distance but in the middle of drawing the circle, the threshold distance is exceeded. In such case, the flag is set which ensures that current coordinate values will continue to be reported, even though the stylus position returns toward the initial coordinates. While using a flag has advantages as mentioned above, it should be understood that use of a flag is not required in all embodiments of the disclosure.

Returning to decision block 152, if the time elapsed between determination of the subsequent coordinate values and the initial coordinate values is not greater than the threshold time (i.e., the elapsed time remains within the threshold), the method 120 continues to block 154 where the sensor surface (e.g., firmware operating in circuitry of the sensor surface or a device driver associated with sensor surface) modifies or alters the subsequent coordinate values that were determined at block 144. In some cases, the subsequent coordinate values are replaced by the initial coordinate values determined at block 128 so that when the modified subsequent coordinate values are reported to an application program, the position of the stylus does not appear to have changed from the initial position. In other cases, the subsequent coordinate values may be modified or altered to reflect a different position. In any case, the modified subsequent coordinate values represent a position other than the actual subsequent position of the stylus detected at block 142. For example, the modified subsequent coordinate values may represent a position that is closer to the initial position of the stylus as detected at block 126, than the subsequent position of the stylus as detected at block 142. After the subsequent coordinate values are modified and reported at block 154, the method 120 continues at point A which returns processing to block 122 for detection of further stylus activity relative to the sensor surface.

In the method 120 illustrated in FIG. 4, the coordinate value reporting process uses both a threshold distance and a threshold duration of time to determine whether to modify the subsequent coordinate values determined at block 144. In other embodiments, the coordinate value reporting process may use only one or the other of a threshold distance or a threshold time to determine whether to modify the subsequent coordinate values before communicating or reporting the subsequent coordinate values. In such embodiments, one or the other of decision blocks 148 or 152 may be eliminated.

Figure 5:
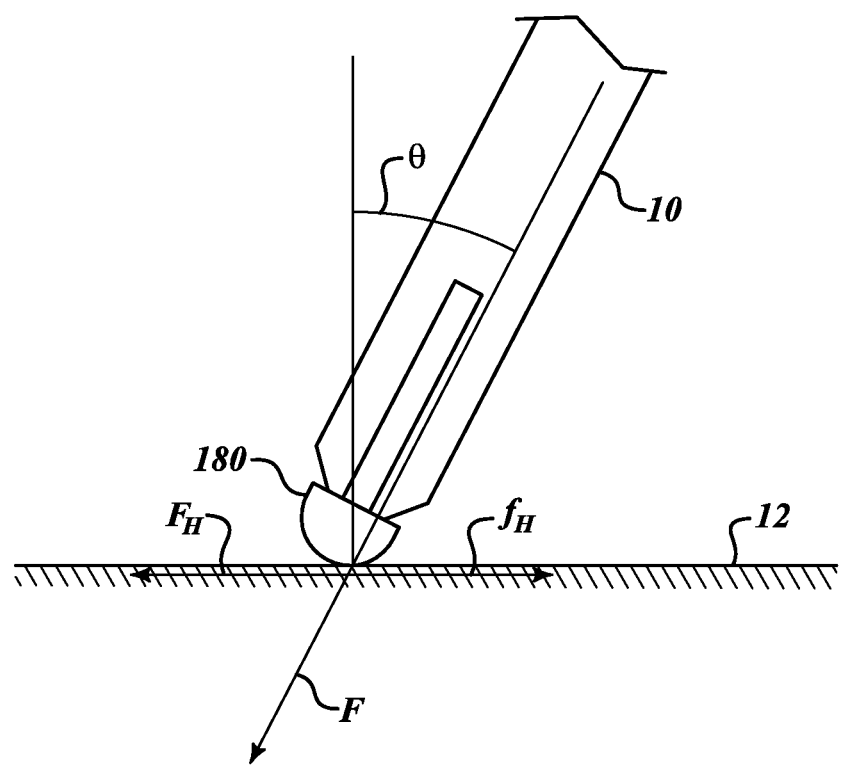
FIG. 5 is a pictorial diagram illustrating component forces of a stylus tip in contact with a sensor surface.

The threshold(s) may be manually, automatically, or dynamically adjusted, particularly if additional information regarding the stylus and/or sensor surface, such as friction or situational usage of the stylus or the sensor surface, is known or detected. FIG. 5 is a pictorial diagram illustrating component forces of a tip 180 of a stylus 10 in contact with a sensor surface 12. In FIG. 5, the stylus 10 is pressed toward the surface 12 at a direction and force indicated by arrow F. The force F in this embodiment has a horizontal component $F_H$ having a magnitude equivalent to F sin θ, where θ is the angle between the longitudinal axis of the stylus and an axis that is normal to the sensor surface. Movement of the stylus 10 in the direction of $F_H$ is resisted by an opposite horizontal friction component $f_H$ caused by interaction of the stylus tip 180 with the sensor surface 12.

The material of the stylus tip 180 affects the amount of friction between the tip 180 and the sensor surface 12. If the material of the tip 180 is firm (for example, as suggested by the stylus tip 220 in FIG. 7A), the stylus 10 may tend to slip more, with other factors being constant. If the tip 180 is soft or is made of a material that has greater grip (for example, as suggested by the stylus tip 240 in FIG. 7B), the stylus 10 may tend to slip less, with other factors being constant. Consequently, embodiments of the present disclosure may adjust the threshold distance and/or time used in the coordinate value reporting process based on the known or detected material of the stylus tip 180. Identification of the tip material may be input by a manufacturer or user of the stylus 10, or an automatic determination of the tip material may be performed, e.g., using a sensor in the stylus 10 that detects and reports the tip type, from which the tip material and consequently the friction presented by the tip 180 on the surface 12 may be determined from data stored in an internal or external memory or accessed online.

Alternatively or in addition, knowledge or detection of the material of the sensor surface 12 may be used to adjust the threshold distance and/or time based on a friction characteristic of the surface 12. If the material of the sensor surface 12 is hard such as glass, the stylus 10 may tend to slip more, with other factors being constant. If the material of the surface 12 is made of a softer material or if a softer, additional layer of material such as a plastic screen protector has been applied to the sensor surface, or if the glass has etching that reduces the smoothness of the surface, the stylus 10 may tend to slip less, with other factors being constant. Of course, knowledge or detection of the material of both the stylus tip 180 and the sensor surface 12 may be used in combination to determine an expected friction characteristic and, based on that friction characteristic, adjust the threshold distance and/or time used in the coordinate value reporting process described herein. In this manner, embodiments of the disclosure can take into account different stylus tips used with different sensor surfaces when compensating for accidental slip of the stylus, e.g., during a tap action. In instances where the friction between the stylus tip and the sensor surface is expected to be higher, the threshold distance and/or time used in the coordinate value reporting process may be set or modified to a lower amount at block 132 in FIG. 4. Conversely, in instances where the friction is expected to be lower, the threshold distance and/or time may be set or modified at block 132 to a higher amount.

Figure 6:
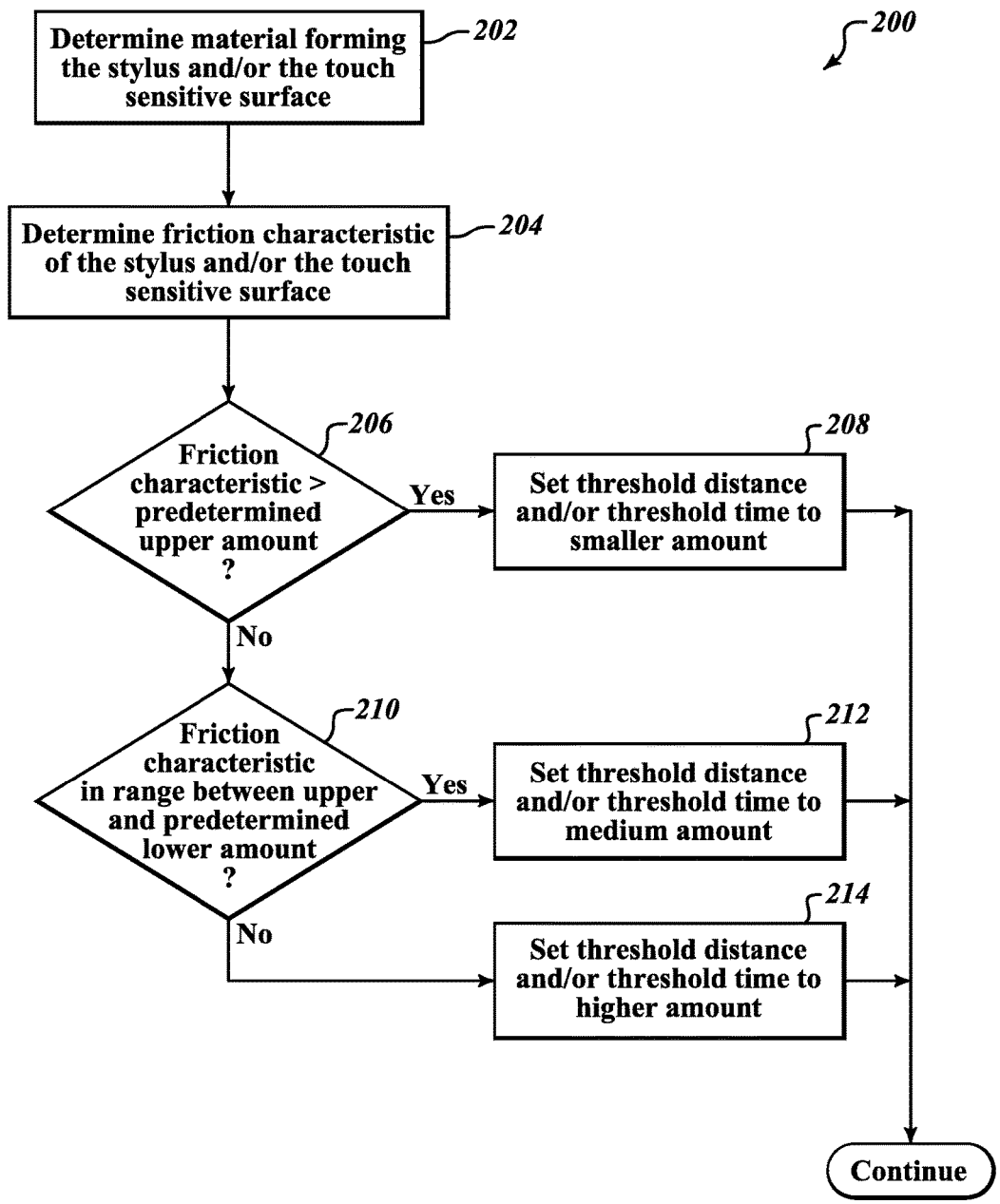
FIG. 6 is a flow diagram illustrating features of a dynamically modifiable coordinate value reporting process according to various embodiments of the present disclosure.

FIG. 6 illustrates features of an example of a dynamically modifiable coordinate value reporting process used according to various embodiments of the present disclosure. The method 200 shown in FIG. 6 begins at block 202 where the material forming the stylus and/or the sensor surface is determined, after which at block 204, a friction characteristic of the stylus and/or the sensor surface is determined. At decision block 206, the determined friction characteristic is evaluated, in this case to determine whether the amount of friction between the stylus tip and the sensor surface is greater than a predetermined upper amount of friction. If the evaluation is affirmative, the method 200 sets the threshold distance and/or threshold time to a smaller amount, as indicated at block 208, after which the method 200 continues, e.g. as shown by the transition from block 132 to block 138 in FIG. 4.

If the evaluation at decision block 206 is negative (i.e., the amount of friction is less than the predetermined upper amount), the method 200 continues to decision block 210 where the friction characteristic is evaluated to determine whether the amount of friction is in a range between the predetermined upper amount and a predetermined lower amount of friction. If the evaluation at decision block 210 is affirmative, the method 200 sets the threshold distance and/or threshold time to a medium amount, as indicated at block 212, after which the method 200 continues, similar to the discussion above with respect to block 208.

If the evaluation at decision block 210 is negative (i.e., the amount of friction is less than the predetermined lower amount), the method 200 proceeds to block 214 where the method 200 sets the threshold distance and/or threshold time to be higher amount. The smaller, medium, and higher amounts for the threshold distance are relative to each other and collectively represent a wide or narrow range of values, as appropriate for the particular embodiment of the disclosure. The method 200 thereafter continues, similar to the discussion above with respect to block 208.

Another factor that may influence the amount of slip during a tap action is the situational usage of the stylus and/or the sensor surface at the time the tap action is taking place. Depending on the situational usage of the stylus and/or the sensor surface when the initial or subsequent position of the stylus is detected, the threshold distance and/or time used in the coordinate value reporting process may be set or modified to higher or lower amount.

As a first example, the situational usage may include a detected angle relative to the sensor surface at which the stylus approaches the surface. This could be due to users having a stylus grip that positions the stylus at angles other than vertical. The angle of approach of the stylus can affect the potential for the stylus tip to slip on the sensor surface. If, for example, the angle at which the stylus approaches the sensor surface is perpendicular to the sensor surface, there may be a lower likelihood or lower amount of accidental slip due to the lack of a substantial lateral component to the stylus motion, and therefore the threshold distance and/or time may be set or modified to a lower amount. In other situational usage as described in the sixth example below, the time and/or distance thresholds may be adjusted to a higher or lower amount based on the angle of the stylus relative to the sensor surface at or after the initial contact of the stylus with the surface.

As a second example, the situational usage may include a detection that the sensor surface is being held in an unstable position, for example if the sensor surface is being held in the user's hand. In various embodiments, one or more accelerometers in the sensor surface may detect unstable movement of the surface. With such usage, there is a greater likelihood or amount of accidental slip, due to the support for the sensor surface being less stable than if the sensor surface were placed on a rigid surface. In this example, the time and/or distance thresholds may be increased or decreased to accommodate the higher or lower potential for slip or amount of slip of the stylus.

As a third example, accidental slip of a stylus may be influenced by the handedness of a user holding the stylus. The situational usage that affects the setting or modifying of the threshold(s) may thus be a known handedness of the user. Certain left-handed or right-handed users may experience a higher or lower likelihood or amount of slip due to their handedness, and thus the time and/or distance thresholds may be adjusted to a corresponding higher or lower amount based on this experience. Alternatively or in addition, the direction of the slip may vary according to the handedness of the user. With this latter example, the distance threshold for different directions of slip movement may be adjusted higher or lower so that the threshold distance may be different depending on the direction of the accidental slip. The user may indicate their handedness in a user profile that is accessible to the software operating the sensor surface, or the handedness of the user may automatically be detected from interaction of the user with the sensor surface.

As a fourth example, the situational usage may include a detected distance from the sensor surface at which the stylus hovers prior to detection of the initial position of the stylus. Some sensor surface technologies are capable of detecting both proximity of a stylus as well as contact of the stylus with the surface. Hovering of the stylus at a greater distance from the sensor surface may be correlated with a lower likelihood that a tap action is taking place. Conversely, when the stylus hovers at a lower distance from the sensor surface prior to making contact, there may be a higher likelihood that a tap action is indicated. In yet other circumstances, the opposite may be true and taken into account, that is, hovering of the stylus at a greater distance from the sensor surface may be correlated with a higher likelihood of a tap action and hovering of the stylus at a lower distance from the sensor surface may correlate with a lower likelihood of tap action. The distance and/or time thresholds in the coordinate value reporting process may be set or modified accordingly.

As a fifth example, the situational usage may include a detected speed at which the stylus approaches the sensor surface using, e.g., a sensor surface technology capable of detecting both proximity of a stylus as well as contact of the stylus with the surface. Different speeds at which the stylus approaches the sensor surface may be correlated with higher and lower likelihood or amount of slip, and thus cause the threshold distance and/or time be set or modified to a higher or lower value.

As a sixth example, the situational usage may include a detected tilt of the stylus with respect to the sensor surface. Detected tilt of the stylus relative to the sensor surface can affect the likelihood or amount of slip by the stylus on the sensor surface. If the stylus is held with little or no tilt (e.g., perpendicular to the sensor surface), there may be a lower likelihood or amount of accidental slip and therefore the threshold distance and/or time may be set or modified to a lower amount. This can be readily seen in FIG. 5 where, if the angle θ is small, e.g., close to zero degrees where the longitudinal axis of the stylus is perpendicular to the surface 12, the force $F_H$ is small resulting in a lower likelihood or amount of slip. If the angle θ is large, the force $F_H$ may be larger resulting in an increased likelihood or amount of slip. The time and/or distance thresholds may be increased or decreased to accommodate the higher or lower potential for slip or amount of slip of the stylus.

As a seventh example, the situational usage may include a detected distance of the stylus from the sensor surface between a detected first initial position and a detected second initial position of the stylus when a user is executing a double tap action, for example as shown in FIG. 1B. The distance of the stylus 10 from the sensor surface 12 to which the user lifts the stylus between the first point of contact and the second point of contact (e.g., the distance 40 shown in FIG. 1B) may indicate a higher or lower likelihood or amount of slip, and accordingly may direct a setting or modification of the threshold distance and/or time to a higher or lower amount. Lifting the stylus a greater distance from the sensor surface between subsequent taps may indicate an intent by the user that the taps represent separate single taps of the sensor surface. Accordingly, the detected distance 40 may result in modifying the threshold time and/or distance to a lower amount. Lifting the stylus a lower distance from the sensor surface between subsequent taps may indicate an intent that the taps represent a double tap action. Accordingly, in such circumstances, the detected distance 40 may cause the sensor surface to modify the threshold time and/or distance to a higher amount so the sensor surface is more likely to report modified second initial coordinate values, thus making it more likely that the application program receiving the modified coordinate values identifies the interaction as a double tap action.

In yet other embodiments, the threshold distance and/or time may be set or modified based on a parameter representing a stylus tip of the stylus. For example, the parameter may be an identification of the stylus tip, which the sensor surface may use to anticipate the amount of friction that the stylus tip will experience when contacting the sensor surface.

It should also be appreciated that the distance and/or time thresholds may be different for different directions of slip movement. The distance and/or time thresholds may be adjusted higher or lower so that the threshold distance and/or time for an accidental slip may be different depending on the direction of detected stylus movement.

Figure 7A:
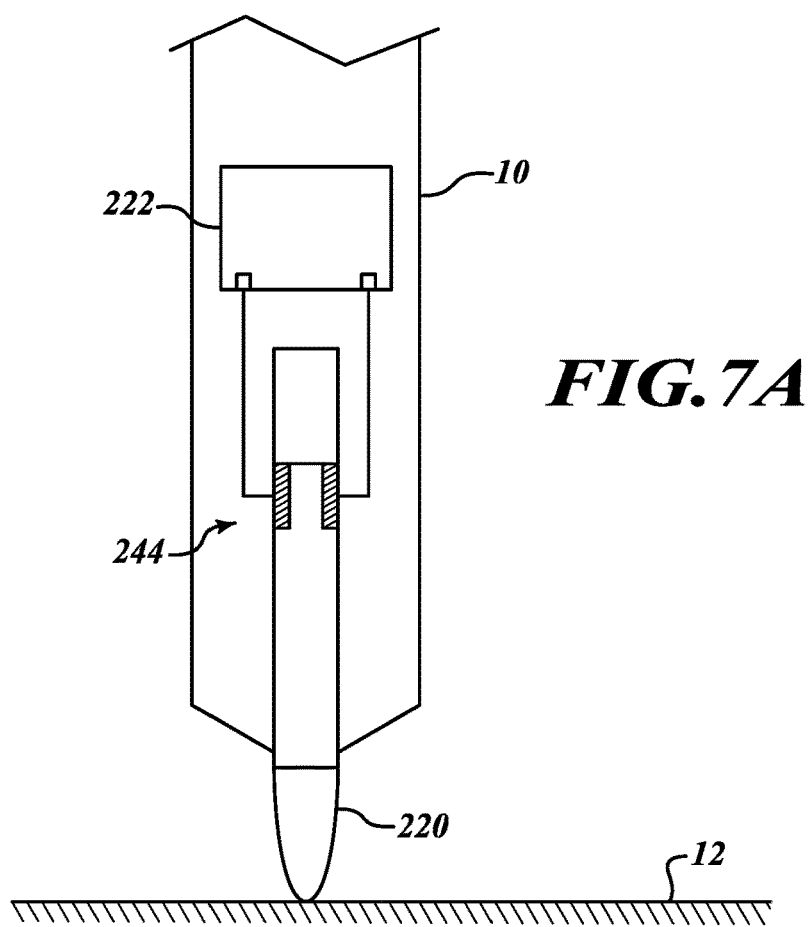
FIGS. 7A and 7B illustrate interchangeable stylus tips in contact with a sensor surface in which the stylus tip is detectable by the stylus.
Figure 7B:
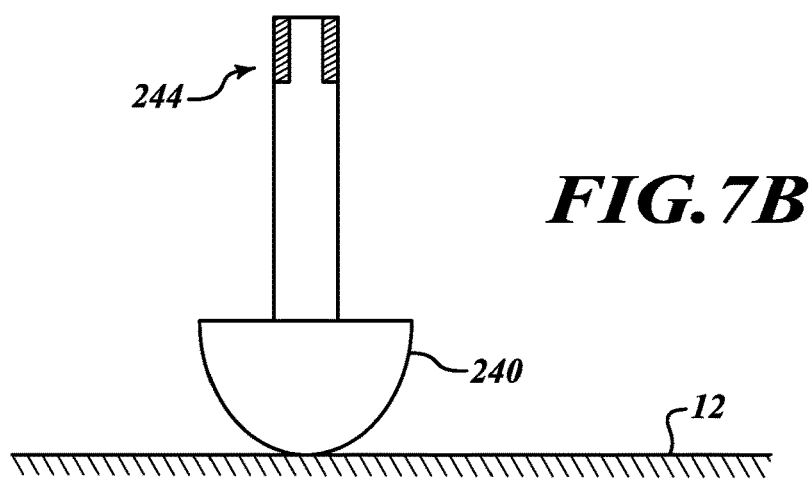

FIGS. 7A and 7B illustrate interchangeable stylus tips 220, 240 in contact with a sensor surface 12 in which the stylus tips 220, 240 are detectable by the stylus 10. In FIG. 7A, the stylus 10 includes processing and transmit circuitry 222 in electrical connection with an upper end 224 of the stylus tip 220. Based on the configuration of the upper end 224, the processing and transmit circuitry 222 identifies the stylus tip 220 and communicates the identity of the stylus tip 220 to the sensor surface 12.

In this example, the stylus tip 220 is held in a socket at a lower end of the stylus 10. The upper end 224 of the stylus tip 220 is thus removably connected with electrical contacts of the processing and transmit circuitry 222. When the stylus tip 220 is removed from the socket and replaced by another stylus tip, such as the stylus tip 240 shown in FIG. 7B, the processing and transmit circuitry 222 uses the different electrical connection of the upper end 244 of the stylus tip 240 to identify the stylus tip and communicate the identity of the stylus tip 240 to the sensor surface 12. In alternative embodiments, the processing and transmit circuitry 222 may have mechanical switches, electrical contacts, optical sensors, magnetic sensors, inductive sensors, or other means of detecting the stylus tip currently in use.

Alternatively or in addition, the threshold distance and/or time may be set or modified at block 132 of FIG. 4 based on a parameter of the sensor surface, wherein the parameter represents a characteristic of the surface contacted by the stylus. For example, the parameter of a sensor surface may reflect a hardness and/or smoothness of the surface. In cases where the characteristic of the surface indicates a harder surface, the threshold may be set or modified to a higher amount to accommodate for a greater likelihood or amount of slip of the stylus on the surface.

As described above, in response to the characteristic of the initial or subsequent position detection exceeding the threshold, the modification of the subsequent coordinate values may cease and thereafter actual subsequent coordinate values are reported. With the method 120 shown in FIG. 4, when either the time or distance threshold is exceeded, the method 120 proceeds to block 154 where a threshold flag is set indicating that a threshold has been exceeded. Thereafter the subsequent coordinate values, e.g., as determined at block 144, are communicated for further processing, as indicated at block 156.

In various embodiments, the present disclosure encompasses a non-transitory computer-readable medium having executable code stored thereon. In response to execution, the code causes processing circuitry to monitor use of a stylus with a sensor surface, e.g. as indicated at block 122 of FIG. 4. In response to detection of the stylus making initial contact with the sensor surface, e.g. as indicated at block 124, the code causes processing circuitry to report the initial coordinate values for the stylus, e.g. as indicated at block 140, based on a detected initial position of the stylus relative to the sensor surface, as indicated at block 126. The initial coordinate values may be reported to an application program, for example.

The code further causes the processing circuitry to detect a subsequent position of the stylus relative to the sensor surface, as indicated at block 142. Based on a dynamically modifiable coordinate value reporting process, e.g. as shown in FIG. 4, the code causes the processing circuitry to communicate (1) the subsequent coordinate values that represent the actual subsequent position of the stylus, e.g., as indicated at block 156, or (2) alternate coordinate values that do not represent the actual subsequent position of the stylus, e.g., as indicated at block 154.

In various embodiments, the executable code may cause the processing circuitry to implement a coordinate value reporting process that is modified based at least in part on the monitored use of the stylus with the sensor surface. Alternatively or in addition, the coordinate value reporting process may be modified based at least in part on a parameter representing a physical configuration of the stylus. In some embodiments, the parameter may represent a stylus tip that is used with the stylus. As described earlier, identification of the stylus tip may be used to identify the material of the stylus tip and thus determine an amount of friction presented by the tip when the tip contacts the sensor surface. A threshold used in the coordinate value reporting process may be set or modified, e.g., as indicated in block 132, to a higher or lower amount in view of the determined friction.

In various embodiments, the executable code may cause the processing circuitry to implement a coordinate value reporting process that is modified based at least in part on a parameter representing a physical configuration of the sensor surface. For example, the material of the sensor surface may be used to determine an amount of friction that is present when the tip of the stylus contacts the sensor surface. A threshold used in the coordinate value reporting process may be set or modified, e.g., as indicated in block 132, to a higher or lower amount in view of the determined friction.

In various embodiments, at least part of the executable code may be included in firmware that is operable in the circuitry of the sensor surface. Alternatively or in addition, at least part of the executable code may be included in a device driver that enables interaction of an application program with the sensor surface.

The coordinate value reporting process implemented by the executable code may include comparing a characteristic of the initial or subsequent position detection with a threshold as noted earlier herein and, based on the comparison, cause the processing circuitry to report (1) the subsequent coordinate values (as indicated in block 156 of FIG. 4) or (2) alternate coordinate values (as indicated in block 154). In some embodiments, the alternate coordinate values are the same as the initial coordinate values.

Where the characteristic of the initial or subsequent position detection is a distance that the stylus traverses from the initial position to the subsequent position and the threshold is a threshold distance, the alternate coordinate values are reported, e.g. to an application program, while the distance between the subsequent coordinate values and the initial coordinate values remains within the threshold distance.

Where the characteristic of the initial or subsequent position detection is a duration of time between determination of the initial coordinate values and the subsequent coordinate values and the threshold is a threshold time, the alternate coordinate values are reported, e.g. to an application program, while the elapsed time between determination of the subsequent coordinate values and the initial coordinate values remains within the threshold time.

In some embodiments, the characteristic of the initial or subsequent position detection includes both a distance between the initial coordinate values and the subsequent coordinate values and an elapsed time between determination of the initial coordinate values and the subsequent coordinate values. In such embodiments, the threshold includes a threshold distance and a threshold time. The executable code causes the processing circuitry to report the alternate coordinate values while the distance between the subsequent coordinate values and the initial coordinate values remains within the threshold distance and the elapsed time between determination of the subsequent coordinate values and the initial coordinate values remains within the threshold time.

Furthermore, the executable code may cause the processing circuitry to set or modify the threshold(s) based on a friction characteristic of the stylus that reflects friction between the stylus in contact with the sensor surface. Alternatively or in addition, the distance and/or time thresholds may be set or modified based on the monitored use of the stylus with the sensor surface.

The present disclosure further contemplates a sensor surface that implements the features described above, including some or all aspects of the method 120 described in FIG. 4 and the method 200 described in FIG. 6. The sensor surface includes a surface that provides an interface for interaction with a stylus, and circuitry configured to detect and report position coordinates reflecting a position of the stylus relative to the surface. In operation, the circuitry may be configured to detect an initial position of the stylus relative to the surface, determine initial coordinate values based on the detected initial position, and report the initial coordinate values for further processing. Thereafter, a subsequent position of the stylus is detected relative to the surface. Based on a coordinate value reporting process as described herein, the sensor surface reports for further processing (1) subsequent coordinate values determined from the subsequent position of the stylus, or (2) alternate coordinate values that are not determined from the subsequent position of the stylus.

The circuitry may include firmware that implements at least part of the coordinate value reporting process and reports (1) the subsequent coordinate values or (2) the alternate coordinate values, e.g., to an application program, for further processing. Alternatively, the coordinate value reporting process may be implemented, at least in part, by a device driver that, when executed, enables interaction of an application program with the sensor surface, and the alternate coordinate values are reported by the device driver to an application program for further processing.

The various embodiments described above can be adjusted, modified, or combined in different configurations to provide yet further embodiments. For instance, with regard to the double tap action illustrated in FIG. 1B, the elapsed time between taps of the double tap action may be measured and compared to a threshold. If the elapsed time between the taps is less than the threshold time, the coordinate values for the detected second initial position 32 may be replaced with the coordinate values for the first initial position 30. In this manner, the application program receiving the modified coordinate values more readily interprets the first and second taps of the surface 12 as indicating a double tap action. If the elapsed time between the first and second taps of the surface 12 is greater than the time threshold, the sensor surface 12 may cease modifying the second initial position coordinates and instead simply report the actual position coordinates of the second initial position 32. In this manner, the application program receiving the coordinate values may readily interpret the two taps of the surface 12 as representing separate tap events. In yet other embodiments as described earlier, the distance between taps of a double tap action may be compared to a threshold distance to determine whether the second initial coordinate values of a second tap should be replaced with the first initial coordinate values of the first tap, before reporting the second initial coordinate values to the application program. Additionally, coordinate values determined subsequent to the first initial coordinate values and the second initial coordinate values, due to movement of the stylus after contacting the sensor surface, may be compared to time and/or distance thresholds and modified as discussed throughout this disclosure.

Embodiments of the present disclosure thus include, but are not limited to, the following examples.

Example 1

A method for operating a sensor surface, comprising detecting an initial position of a stylus relative to the sensor surface; determining initial coordinate values based on the detected initial position of the stylus; communicating the initial coordinate values for further processing; determining subsequent coordinate values based on a subsequent position of the stylus detected after detecting the initial position; based on a characteristic of the initial or subsequent position detection, modifying the subsequent coordinate values to represent a position that is different than the subsequent position of the stylus; and communicating the modified coordinate values for further processing.

Example 2

The method of Example 1, wherein the initial coordinate values are determined when the stylus initially contacts the sensor surface.

Example 3

The method of Examples 1 or 2, wherein the modified coordinate values are communicated to an application program and/or an operating system for further classification of stylus movement based on the modified coordinate values in place of the determined subsequent coordinate values.

Example 4

The method of any preceding example, wherein the subsequent coordinate values are modified by firmware operating in circuitry of the sensor surface, and the modified coordinate values are communicated by the firmware to an application program for further processing.

Example 5

The method of any preceding example, wherein the subsequent coordinate values are modified by a device driver that enables interaction of an application program with the sensor surface, and the modified coordinate values are communicated by the device driver to the application program for further processing.

Example 6

The method of any preceding example, wherein modifying the subsequent coordinate values based on a characteristic of the initial or subsequent position detection includes comparing the characteristic with a threshold.

Example 7

The method of Example 6, wherein the characteristic is a distance between the initial coordinate values and the subsequent coordinate values and the threshold is a threshold distance, and wherein the subsequent coordinate values are modified while the distance between the subsequent coordinate values and the initial coordinate values remains within the threshold distance.

Example 8

The method of Example 6, wherein the characteristic is elapsed time between determination of the initial coordinate values and the subsequent coordinate values and the threshold is a threshold time, and wherein the subsequent coordinate values are modified while the elapsed time remains within the threshold time.

Example 9

The method of Example 6, wherein the characteristic includes both a distance between the initial coordinate values and the subsequent coordinate values and elapsed time between determination of the initial coordinate values and the subsequent coordinate values, and the threshold includes a threshold distance and a threshold time, and wherein the subsequent coordinate values are modified while the distance between the subsequent coordinate values and the initial coordinate values remains within the threshold distance and the elapsed time remains within the threshold time.

Example 10

The method of Example 6, further comprising setting or modifying the threshold based on a friction characteristic of the stylus in contact with the sensor surface.

Example 11

The method of Example 10, wherein the friction characteristic is determined based on a material forming a tip of the stylus that contacts the sensor surface.

Example 12

The method of Examples 10 or 11, wherein the friction characteristic is determined based on a material of the sensor surface contacted by the stylus.

Example 13

The method of any of Examples 6 to 12, further comprising setting or modifying the threshold based on a situational usage of one or both of the stylus or the sensor surface.

Example 14

The method of Example 13, wherein the situational usage includes a detected angle relative to the sensor surface at which the stylus approaches the sensor surface.

Example 15

The method of Examples 13 or 14, wherein the situational usage includes a detection that the sensor surface is being held in an unstable position.

Example 16

The method of any of Examples 13 to 15, wherein the situational usage is a known or detected handedness of a user holding the stylus.

Example 17

The method of any of Examples 13 to 16, wherein the situational usage includes a detected distance from the sensor surface at which the stylus hovers prior to detection of the initial position of the stylus.

Example 18

The method of any of Examples 13 to 17, wherein the situational usage includes a detected speed at which the stylus approaches the sensor surface.

Example 19

The method of any of Examples 13 to 18, wherein the situational usage includes a detected tilt of the stylus with respect to the sensor surface.

Example 20

The method of any of Examples 13 to 19, wherein the situational usage includes a detected distance of the stylus from the sensor surface between detection of a first initial position and detection of the second initial position of the stylus.

Example 21

The method of any of Examples 6 to 20, further comprising setting or modifying the threshold based on a parameter representing a stylus tip of the stylus.

Example 22

The method of any of Examples 6 to 21, further comprising setting or modifying the threshold based on a parameter of the sensor surface, wherein the parameter represents a characteristic of the surface contacted by the stylus.

Example 23

The method of any of Examples 6 to 22, further comprising ceasing modification of the subsequent coordinate values in response to the characteristic of the initial or subsequent position detection exceeding the threshold, and thereafter communicating the determined subsequent coordinate values for further processing.

Example 24

The method of any preceding example, wherein the modified coordinate values represent a position that is closer to the initial position of the stylus than the subsequent position of the stylus.

Example 25

The method of any preceding example, wherein the subsequent coordinate values are modified by replacing the subsequent coordinate values with the initial coordinate values.

Example 26

A non-transitory computer-readable medium having executable code stored thereon, wherein in response to execution, the code causes processing circuitry to monitor use of a stylus with a sensor surface; in response to detection of the stylus making initial contact with the sensor surface, report initial coordinate values for the stylus based on a detected initial position of the stylus relative to the sensor surface, wherein the initial coordinate values are reported to an application program or an operating system; detect a subsequent position of the stylus relative to the sensor surface; and based on a dynamically modifiable coordinate value reporting process, report to the application program alternate coordinate values that do not represent the detected subsequent position of the stylus.

Example 27

The computer-readable medium of Example 26, wherein the coordinate value reporting process is modified based at least in part on the monitored use of the stylus with the sensor surface.

Example 28

The computer-readable medium of Examples 26 or 27, wherein the coordinate value reporting process is modified based at least in part on a parameter representing a physical configuration of the stylus.

Example 29

The computer-readable medium of Example 28, wherein the parameter represents a stylus tip that is used with the stylus.

Example 30

The computer-readable medium of any of Examples 26 to 29, wherein the coordinate value reporting process is modified based at least in part on a parameter representing a physical configuration of the sensor surface.

Example 31

The computer-readable medium of any of Examples 26 to 30, wherein at least part of the executable code is included in firmware that is operable in the circuitry of the sensor surface.

Example 32

The computer-readable medium of any of Examples 26 to 31, wherein at least part of the executable code is included in a device driver that enables interaction of an application program with the sensor surface.

Example 33

The computer-readable medium of any of Examples 26 to 32, wherein the coordinate value reporting process includes comparing a characteristic of the initial or subsequent position detection with a threshold, and based on the comparison, reporting (1) the subsequent coordinate values or (2) the alternate coordinate values.

Example 34

The computer-readable medium of Example 33, wherein the characteristic is a distance between the initial coordinate values and the subsequent coordinate values and the threshold is a threshold distance, and wherein the alternate coordinate values are reported while the distance between the subsequent coordinate values and the initial coordinate values remains within the threshold distance.

Example 35

The computer-readable medium of Example 33, wherein the characteristic is elapsed time between determination of the initial coordinate values and the subsequent coordinate values and the threshold is a threshold time, and wherein the alternate coordinate values are reported while the elapsed time remains within the threshold time.

Example 36

The computer-readable medium of Example 33, wherein the characteristic includes both a distance between the initial coordinate values and the subsequent coordinate values and elapsed time between determination of the initial coordinate values and the subsequent coordinate values, and the threshold includes a threshold distance and a threshold time, and wherein the alternate coordinate values are reported while the distance between the subsequent coordinate values and the initial coordinate values remains within the threshold distance and the elapsed time remains within the threshold time.

Example 37

The computer-readable medium of any of Examples 33 to 36, wherein the threshold is set or modified based on a friction characteristic of the stylus that reflects friction between the stylus in contact with the sensor surface.

Example 38

The computer-readable medium of any of Examples 33 to 37, wherein the threshold is set or modified based on the monitored use of the stylus with the sensor surface.

Example 39

The computer-readable medium of any of Examples 26 to 38, wherein the alternate coordinate values are the same as the initial coordinate values.

Example 40

A sensor surface, comprising a surface providing an interface for interaction with a stylus; and circuitry configured to detect and report a position of the stylus relative to the surface, wherein, in operation, the circuitry is configured to detect an initial position of the stylus relative to the surface; determine initial coordinate values based on the detected initial position; report the initial coordinate values for further processing; detect a subsequent position of the stylus relative to the surface; and based on a dynamically modifiable coordinate value reporting process, report alternate coordinate values for further processing, wherein the alternate coordinate values are not determined from the subsequent position of the stylus.

Example 41

The sensor surface of Example 40, wherein the circuitry includes firmware that implements at least part of the coordinate value reporting process and reports the alternate coordinate values to an application program for further processing.

Example 42

The sensor surface of Examples 40 or 41, wherein the coordinate value reporting process is implemented, at least in part, by a device driver that enables interaction of an application program with the sensor surface, and the alternate coordinate values are reported by the device driver to an application program for further processing.

Example 43

The sensor surface of any of Examples 40 to 42, wherein the coordinate value reporting process includes comparing a distance between the initial coordinate values and the subsequent coordinate values with a dynamically modifiable threshold distance, and wherein the alternate coordinate values are reported while the distance between the subsequent coordinate values and the initial coordinate values remains within the threshold distance.

Example 44

The sensor surface of any of Examples 40 to 43, wherein the coordinate value reporting process includes comparing a time elapsed between determination of the initial coordinate values and determination of the subsequent coordinate values with a dynamically modifiable threshold time, and wherein the alternate coordinate values are reported while the time elapsed between determination of the subsequent coordinate values and the initial coordinate values remains within the threshold time.

Example 45

The sensor surface of any of Examples 40 to 44, wherein the alternate coordinate values are the same as the initial coordinate values.

Example 46

A method, computer-readable medium, or sensor surface that involves a surface providing an interface for interaction with a stylus; and circuitry configured to detect and report a position of the stylus relative to the surface, wherein, in operation, the circuitry is configured to detect a first initial position of the stylus relative to the surface; determine first initial coordinate values based on the detected first initial position; report the first initial coordinate values for further processing; detect a second initial position of the stylus relative to the surface; determine second initial coordinate values based on the detected second initial position; and based on a coordinate value reporting process that may be dynamically modifiable, report alternate or modified second initial coordinate values for further processing as representing the second initial position of the stylus, wherein the alternate or modified second initial coordinate values are not determined from the second initial position of the stylus.

Example 47

The method, computer-readable medium, or sensor surface of Example 46, wherein, in operation, the circuitry is further configured to detect a subsequent position of the stylus relative to the surface following detection of the first and/or second initial positions; and based on the coordinate value reporting process, report alternate or modified coordinate values for further processing, wherein the alternate or modified coordinate values are not determined from the subsequent position of the stylus.

Example 48

The method, computer-readable medium, or sensor surface of Examples 46 or 47, wherein the circuitry includes firmware that implements at least part of the coordinate value reporting process and reports the alternate or modified coordinate values to an application program for further processing.

Example 49

The method, computer-readable medium, or sensor surface of any of Examples 46 to 48, wherein the coordinate value reporting process is implemented, at least in part, by a device driver that enables interaction of an application program with the sensor surface, and the alternate or modified coordinate values are reported by the device driver to an application program for further processing.

Example 50

The method, computer-readable medium, or sensor surface of any of Examples 46 to 49, wherein the coordinate value reporting process includes comparing a distance between the first initial coordinate values and the second initial coordinate values with a threshold distance that may be dynamically modifiable, and wherein the alternate or modified second initial coordinate values are reported as representing the second initial position of the stylus when the distance between the second initial coordinate values and the first initial coordinate values is within the threshold distance.

Example 51

The method, computer-readable medium, or sensor surface of any of Examples 46 to 50, wherein the coordinate value reporting process includes comparing a time elapsed between determination of the first initial coordinate values and determination of the second initial coordinate values with a threshold time that may be dynamically modifiable, and wherein the alternate or modified second initial coordinate values are reported as representing the second initial position of the stylus when the time elapsed between determination of the second initial coordinate values and the first initial coordinate values is within the threshold time.

Example 52

The method, computer-readable medium, or sensor surface of any of Examples 46 to 51, wherein the alternate or modified second initial coordinate values reported as representing the second initial position of the stylus are the same as the first initial coordinate values of the stylus.

The foregoing embodiments are exemplary in that the described elements and actions may be arranged or performed in any combination, subcombination, or sequence as appropriate and still achieve the aims of the present disclosure. Accordingly, the present disclosure encompasses additional, alternative embodiments that incorporate features from the description, claims, and drawings, in different configurations than the embodiments and examples explicitly described above. It will be apparent to those skilled in the relevant technology that such alternative embodiments, either alone or in combination with yet additional elements and actions described herein, may be utilized within the scope of the present disclosure. Furthermore, in general, the terms used in the following claims should not be construed to limit the claims to the specific embodiments disclosed in the specification and the claims, but should be construed to include all possible embodiments along with the full scope of equivalents to which such claims are entitled.

The invention claimed is:

1. A method for operating a sensor surface, comprising:
   detecting, by circuitry in the sensor surface, an initial position of a stylus relative to the sensor surface;
   determining, by the circuitry in the sensor surface, initial coordinate values based on the detected initial position of the stylus;
   communicating the initial coordinate values to processing circuitry in communication with the circuitry in the sensor surface for further processing;
   determining, by the circuitry in the sensor surface, subsequent coordinate values based on a subsequent position of the stylus detected after detecting the initial position; and
   determining, by the circuitry in the sensor surface, whether the subsequent position of the stylus is within a predetermined distance from the initial position, and
   (a) when the subsequent position of the stylus is not within the predetermined distance from the initial position, communicating the subsequent coordinate values to the processing circuitry for further processing, and
   (b) when the subsequent position of the stylus is within the predetermined distance from the initial position, replacing the subsequent coordinate values with the initial coordinate values and communicating the initial coordinate values instead of the subsequent coordinate values to the processing circuitry for further processing,
   wherein in sub step (b) the initial coordinate values are communicated to an application program or an operating system that is operated by the processing circuitry for further classification of stylus movement based on the initial coordinate values that are communicated in place of the determined subsequent coordinate values.

2. A method for operating a sensor surface, comprising:
   detecting, by circuitry in the sensor surface, an initial position of a stylus relative to the sensor surface;
   determining, by the circuitry in the sensor surface, initial coordinate values based on the detected initial position of the stylus;
   communicating the initial coordinate values to processing circuitry in communication with the circuitry in the sensor surface for further processing;

determining, by the circuitry in the sensor surface, subsequent coordinate values based on a subsequent position of the stylus detected after detecting the initial position; and determining, by the circuitry in the sensor surface, whether the subsequent position of the stylus is within a predetermined distance from the initial position, and (a) when the subsequent position of the stylus is not within the predetermined distance from the initial position, communicating the subsequent coordinate values to the processing circuitry for further processing, and (b) when the subsequent position of the stylus is within the predetermined distance from the initial position, replacing the subsequent coordinate values with the initial coordinate values and communicating the initial coordinate values instead of the subsequent coordinate values to the processing circuitry for further processing, wherein the subsequent coordinate values are replaced by the initial coordinate values by firmware operating in the circuitry of the sensor surface, and the initial coordinate values are communicated by the firmware to an application program or operating system operated by the processing circuitry for further processing.

3. A method for operating a sensor surface, comprising:
detecting, by circuitry in the sensor surface, an initial position of a stylus relative to the sensor surface;
determining, by the circuitry in the sensor surface, initial coordinate values based on the detected initial position of the stylus;
communicating the initial coordinate values to processing circuitry in communication with the circuitry in the sensor surface for further processing;
determining, by the circuitry in the sensor surface, subsequent coordinate values based on a subsequent position of the stylus detected after detecting the initial position; and
determining, by the circuitry in the sensor surface, whether the subsequent position of the stylus is within a predetermined distance from the initial position, and (a) when the subsequent position of the stylus is not within the predetermined distance from the initial position, communicating the subsequent coordinate values to the processing circuitry for further processing, and (b) when the subsequent position of the stylus is within the predetermined distance from the initial position, replacing the subsequent coordinate values with the initial coordinate values and communicating the initial coordinate values instead of the subsequent coordinate values to the processing circuitry for further processing, wherein the subsequent coordinate values are replaced by the initial coordinate values by a device driver that enables interaction of an application program or operating system operated by the processing circuitry with the sensor surface, and the initial coordinate values are communicated by the device driver to the application program or operating system for further processing.

4. The method of claim 1, wherein the predetermined distance from the initial position represents a threshold distance, and wherein the circuitry in the sensor surface determines whether the subsequent position of the stylus is within the predetermined distance by determining a distance between the subsequent coordinate values and the initial coordinate values and comparing the determined distance with the threshold distance.

5. The method of claim 4, wherein comparing the determined distance with the threshold distance includes setting a flag when the determined distance meets or exceeds the threshold distance.

6. The method of claim 5, further comprising initially setting the flag to indicate that the determined distance has not met or exceeded the threshold distance.

7. The method of claim 4, wherein the subsequent coordinate values are replaced by the initial coordinate values while the determined distance between the subsequent coordinate values and the initial coordinate values remains within the threshold distance.

8. The method of claim 4, further comprising:
determining an elapsed time between determination of the initial coordinate values and determination of the subsequent coordinate values; and
replacing the subsequent coordinate values with the initial coordinate values while the elapsed time remains within a predetermined time that represents a threshold time.

9. The method of claim 8, wherein the subsequent coordinate values are replaced by the initial coordinate values while the determined distance between the subsequent coordinate values and the initial coordinate values remains within the threshold distance and the elapsed time remains within the threshold time.

10. The method of claim 4, further comprising setting or modifying the threshold distance based on a friction characteristic of the stylus in contact with the sensor surface.

11. The method of claim 4, further comprising setting or modifying the threshold distance based on a situational usage of one or both of the stylus or the sensor surface.

12. The method of claim 4, further comprising setting or modifying the threshold distance based on a parameter representing a stylus tip of the stylus.

13. The method of claim 4, further comprising setting or modifying the threshold distance based on a parameter of the sensor surface, wherein the parameter represents a characteristic of the surface contacted by the stylus.

14. The method of claim 4, further comprising ceasing to replace the subsequent coordinate values with the initial coordinate values in response to the determined distance exceeding the threshold distance, and thereafter communicating the determined subsequent coordinate values to be processing circuitry for further processing.

15. The method of claim 1, the predetermined distance is set based on a friction characteristic of the stylus in contact with the sensor surface, wherein the friction characteristic is determined based on a material of the sensor surface contacted by the stylus.

16. The method of claim 1, wherein the predetermined distance is set or modified based on a situational usage of one or both of the stylus or the sensor surface.

17. The method of claim 16, wherein the situational usage is a known or detected handedness of a user holding the stylus.

18. The method of claim 16, wherein the situational usage includes a detected tilt of the stylus with respect to the sensor surface.

19. A position detecting device, comprising:
a sensor surface providing an interface for interaction with a stylus; and
circuitry in the sensor surface configured to electronically detect and report a position of the stylus relative to the sensor surface;
wherein, in operation, the circuitry in the sensor surface is configured to:

electronically detect an initial position of the stylus relative to the sensor surface;

determine initial coordinate values based on the detected initial position;

communicate the initial coordinate values to processing circuitry for further processing;

electronically detect a subsequent position of the stylus relative to the sensor surface;

determine subsequent coordinate values based on the detected subsequent position; and determine whether the subsequent position of the stylus is within a predetermined distance from the initial position, and (a) when the subsequent position of the stylus is not within the predetermined distance from the initial position, communicate the subsequent coordinate values to the processing circuitry for further processing, and (b) when the subsequent position of the stylus is within the predetermined distance from initial position, replace the subsequent coordinate values with the initial coordinate values and communicate the initial coordinate values instead of the subsequent coordinate values to the processing circuitry for further processing, wherein in sub step (b) the initial coordinate values are communicated to an application program or an operating system that is operated by the processing circuitry for further classification of stylus movement based on the initial coordinate values that are communicated in place of the determined subsequent coordinate values.

20. The position detection device of claim 19, wherein the circuitry in the sensor surface is further configured to:

determine an elapsed time between determination of the initial coordinate values and determination of the subsequent coordinate values; and replace the subsequent coordinate values with the initial coordinate values while the elapsed time remains within a predetermined time.

21. A method for operating a sensor surface, comprising:

detecting, by circuitry, a first position pointed to by a stylus on the sensor surface;

detecting, by the circuitry, a second position pointed to by the stylus on the sensor surface, wherein the second position is consecutively detected after the first position is detected;

detecting, by the circuitry, a tilt of the stylus relative to the sensor surface when the stylus points to at least the first position on the sensor surface; and distinguishing, by the circuitry, a first movement and a second movement of the stylus on the sensor surface, based on the detected first position, the detected second position, and the detected tilt.

22. The method of claim 21, wherein the first movement and the second movement are respectively a tap and a drag of the stylus on the sensor surface.

23. The method of claim 21, wherein distinguishing, by the circuitry, the first movement and the second movement is based on a threshold that is varied by the detected tilt.

* * * * *